Sept. 11, 1928.

F. G. BREMER 1,684,259

AUTOMOBILE BUMPER

Filed April 19, 1928

INVENTOR
Frederick G. Bremer
By Archworth Martin,
Attorney.

Patented Sept. 11, 1928.

1,684,259

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed April 19, 1928. Serial No. 271,143.

My invention relates to automobile bumper structures such as are employed at the front and rear ends of motor vehicles, for absorbing the force of impacts.

One object of my invention is to provide an improved means for yieldably supporting impact bars of the rigid type.

Another object of my invention is to provide an improved form of buffer spring or riser for bumper bars.

Still another object of my invention is to provide simplified means for connecting a bumper bar to a supporting member.

Figure 1:
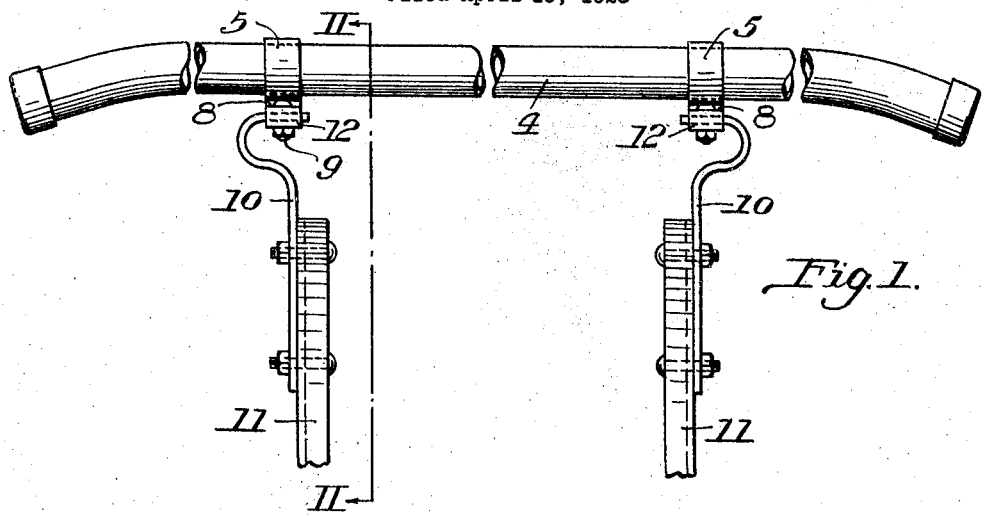
Figure 2:
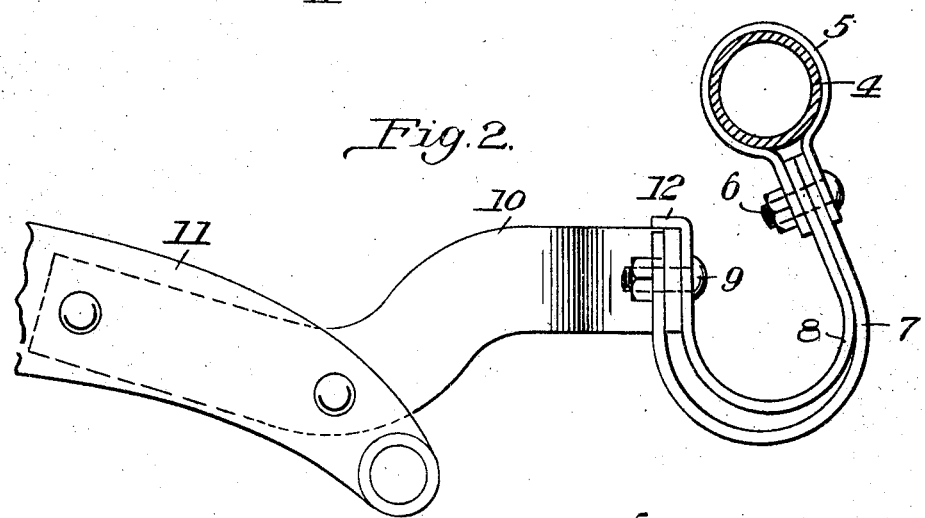
Figure 3:
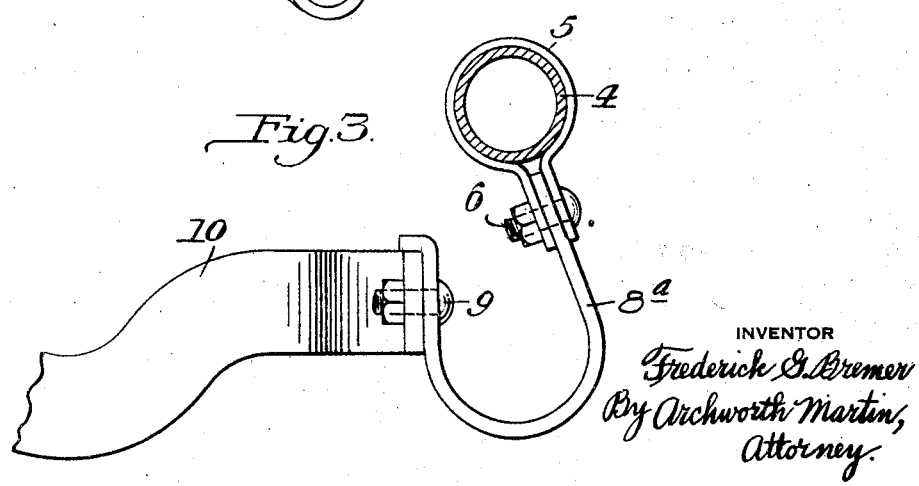

Some of the forms which my invention may take are shown in the accompanying drawing, wherein Figure 1 is a fragmentary plan view of a bumper structure; Fig. 2 is a view taken on the line II—II of Fig. 1, and Fig. 3 is a view similar to Fig. 2, but showing a modified form of riser.

Referring to Figs. 1 and 2, I show a bumper bar 4 which is of the rigid type and of tubular form, but which may obviously be non-rigid and of various other forms.

Clamping collars 5 embrace the bumper bars and are perforated for the reception of bolts 6 which serve not only to clamp the collars 5 about the bar, but which also serve to attach the collars to risers or buffer springs 7 and 8, at their forward ends. The rear ends of the buffer springs are connected by bolts 9 to brackets or supporting arms 10 which are bolted to side frame members 11 of an automobile (not shown).

The risers 7 and 8 are preferably of spring steel, as are also the bracket arms 10, to produce a desired yielding effect upon the imposition of impacts against the bumper bar 4.

The outer ends of the arms 10 are inturned as shown more clearly in Fig. 1, and the inner end portions of the risers 7 and 8 are disposed against opposite sides of such inturned ends. In addition, the inner extremities 12 of the risers 8 are bent at right angles, so that they will abut against the upper edges of the arms 10. The bolts 9 securely clamp the risers and the bracket arms 10, and the portions 12 of the risers 8 serve to prevent pivotal movement of the risers about the bolts 9, notwithstanding the fact that only one bolt 9 is employed for connecting each pair of risers to its associated arm 10. The arrangement thus eliminates the necessity for the additional number of bolts or other attaching members heretofore deemed necessary in order to form a structure of proper strength and rigidity.

In Fig. 3, I have shown a modified arrangement, wherein a single riser 8ª is employed in lieu of each pair of risers or buffer springs 7—8. Each of two risers 8ª will be clamped to the bumper bar 4 by the clamping collar 5 and the bolt 6, and to the bracket arm 10 by the bolt 9. This single riser arrangement for each end of the bumper bar will suffice for the lighter cars, and the riser 8ª may be made relatively heavy for cars of greater weight.

I claim as my invention:—

1. Bumper structure comprising a bumper bar, a riser therefor, a support for the riser, means for connecting the outer end of the riser to the said bar, and means for connecting an inner portion of the riser to the support, the inner end of the riser partially embracing said support.

2. Bumper structure comprising a bumper bar, a riser therefor, a support for the riser, means for connecting the outer end of the riser to the said bar, and means for connecting an inner portion of the riser to the support, the said inner portion of the riser abutting against the said support, and the inner extremity of the riser being bent to an angle and abutting against another portion of the support.

3. Bumper structure comprising a bumper bar, a riser connected at its outer end to the bumper bar, a supporting bar disposed in a horizontal plane, means for connecting an inner portion of the riser to the supporting bar, in abutting engagement with a vertical face of the supporting bar, and a portion of the riser being deflected to overlie a horizontally-extending surface of the supporting bar.

4. Bumper structure comprising a bumper bar, a riser connected at its outer end to the bumper bar, a supporting bar disposed in a horizontal plane, means for connecting an inner portion of the riser to the supporting bar in abutting engagement with one surface thereof, and a portion of said riser being deflected to abut against another surface of the supporting bar that is disposed at an angle to the first-named surface.

5. Bumper structure comprising a bumper bar, a pair of risers connected at their outer ends to said bar, a supporting bar, and means for securing the inner ends of said risers to opposite sides of said supporting bar, one of said risers having a portion deflected to extend over another portion of said bar.

6. Bumper structure comprising a bumper bar, a pair of risers connected at their outer ends to said bar, a supporting bar, and means for securing the inner ends of said risers to the supporting bar, one of said risers being provided with a portion disposed at right angles to the plane of attachment of said risers and abutting against another portion of the supporting bar.

7. Bumper structure comprising a bumper bar, a riser connected at its outer end to said bar, a supporting member, a bolt for connecting the inner end of said riser to the supporting member, and means independently of the bolt for preventing pivotal movement of the riser about said bolt.

8. Bumper structure comprising a bumper bar, a riser connected at its outer end to said bar, a supporting member, a bolt for connecting the inner end of said riser to the supporting member, and a portion on said riser having interlocking engagement with the supporting bar, to prevent pivotal movement of the riser about the axis of said bolt.

9. Bumper structure comprising a bumper bar, a riser connected to the bar, a support connected to the riser, and a portion of the riser abutting against a portion of the said support that is disposed at an angle to the portion to which the riser is connected.

10. The combination with a bumper bar and a support, of a riser comprising a pair of buffer springs that are connected together at points adjacent to the bar and to the support, respectively, and means for connecting the riser to the bar, one of said springs being bolted to the support and having a portion abutting against one face of said support, in a plane parallel to the axis of the bolt.

11. The combination with a bumper bar and a support, of a riser comprising a pair of buffer springs that are connected together at point adjacent to the bar and to the support, respectively, and means for connecting the riser to the bar, one of said springs having a portion abutting against one face of said support, in a plane parallel to the axis of the bolt.

12. The combination with a bumper bar and a support, of a riser comprising a pair of buffer springs that are connected together at points adjacent to the bar and to the support, respectively, and means for connecting the riser to the bar, one of said springs being bolted to the support and having an end portion abutting against one face of said support in a plane parallel to the axis of the bolt, the springs being spaced apart at points intermediate their ends.

13. The combination with a bumper bar and a support, of a riser comprising a pair of buffer springs, means for connecting the riser to the bar, and means for connecting the riser against one surface of the support, a portion of the riser abutting against another surface of the support to prevent pivotal movement thereof with respect to the support.

14. The combination with a bumper bar and a support, of a riser comprising a pair of buffer springs, means for connecting the riser to the bar, and means for connecting the riser against one surface of the support, a portion of the riser abutting against another surface of the support to prevent pivotal movement thereof with respect to the support, the springs being connected together at points adjacent to the bar and the support and being spaced apart at point intermediate the said points of connection.

In testimony whereof I, the said FREDERICK G. BREMER have hereunto set my hand.

FREDERICK G. BREMER